United States Patent

[11] 3,621,272

[72] Inventor Michel Carbonel
Paris, France
[21] Appl. No. 842,102
[22] Filed July 16, 1969
[45] Patented Nov. 16, 1971
[73] Assignee Thomson- CSF
[32] Priority July 25, 1968
[33] France
[31] 160,539

[54] VARIABLE-THRESHOLD MAGNETIC CIRCUIT ELEMENT
4 Claims, 7 Drawing Figs.

[52] U.S. Cl. .................... 307/88 LC, 340/174 TF
[51] Int. Cl. .................... H03k 19/168, G11c 11/14
[50] Field of Search .................... 340/174; 307/88

[56] References Cited

UNITED STATES PATENTS

| | | | |
|---|---|---|---|
| 3,145,159 | 8/1964 | Berg .................... | 340/174 X |
| 3,531,250 | 7/1970 | Bobeck .................... | 340/174 |
| 3,275,842 | 9/1966 | Baycura .................... | 307/88 |
| 3,354,445 | 11/1967 | Prohofsky et al. .................... | 340/174 |

OTHER REFERENCES

IBM Technical Disclosure Bulletin, " Film Storage Device," Halvarson, Vol. 8, No. 12, 5/66, p.-1,806, copy in 340–174 CF.

*Primary Examiner*—Stanley M. Urynowicz, Jr.
*Attorney*—Cushman, Darby & Cushman

ABSTRACT: A magnetic element having an easy magnetic axis is subjected to current pulses producing a field directed along this axis. These pulses are sufficiently short in order not to cause the direction of magnetization to change. This will take place only if these pulses coincide in time with other pulses which produce a field perpendicular to the easy magnetic axis.

VARIABLE-THRESHOLD MAGNETIC CIRCUIT ELEMENT

The present invention relates to magnetic circuit elements.

Both in logic circuits and in magnetic memories, magnetic elements may be extremely useful, the triggering threshold of which can be varied without changing the nature of the information which they contain. The operation of an element of this kind may be as follows: a first current, the "threshold current" lowers the threshold of the element and a second current, the "control current," does not cause the magnetization of the element to change state except in the presence of the threshold current. In a memory, for example, the coincidence of the two currents will cause the element to change state, while the presence of only one current, will have no effect. Numerous variant embodiments exist of course, but the general principle is by and large the same throughout.

It is an object of this invention to provide a magnetic element of the type indicated hereinbefore, which is particularly simple in design and can be applied both to memories and to magnetic logic circuits.

According to the invention, there is provided a method for switching the magnetization of a magnetic element, having a magnetic anisotropy, from a first direction to a second direction comprising the step of providing the said element a first flux directed along the easy magnetization axis and simultaneously a second flux perpendicular to said easy axis.

For a better understanding of the invention and to show how the same may be carried into effect, reference will be made the drawing accompanying the following description and in which;

FIGS. 1 and 2 explain the principle of the invention;

Figure 1:
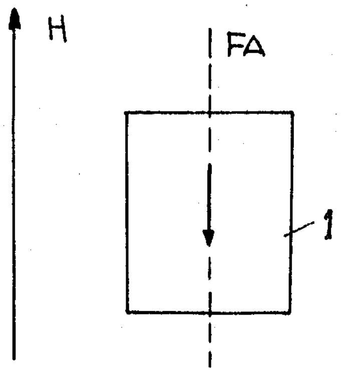
Figure 2:
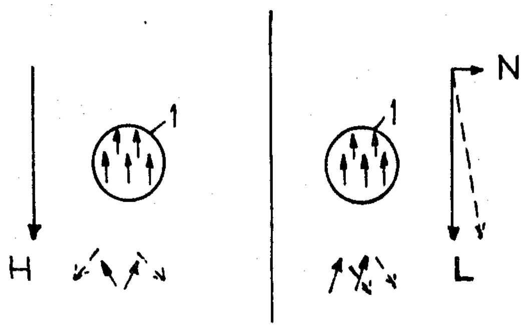

In FIG. 1, a rectangular thin, anisotropic ferromagnetic film 1, can be seen, having the easy magnetic axis FA. If an attempt is made to reverse its magnetization by means of a field $\vec{L}$ strictly parallel to said axis, a blocking effect is produced and the reversal of magnetization will be rather slow. In other words, as FIG. 2 shows, the spins (full-drawn arrows) will change state by rotating in a random fashion, as indicated by the broken line arrows.

The result is that the mutually opposing spins block one another. The response time will therefore be long. At the right-hand part of FIG. 2, there can be seen applied to the same film, simultaneously, a field $\vec{L}$ parallel to the easy axis FA, and a field $\vec{N}$ which is much weaker and is directed perpendicularly vis-a-vis said axis. The latter field has the effect of causing all the spins to change state in the same direction. They accordingly change state in a coherent manner in the same direction and the response time is therefore much shorter.

Thus, the current pulse producing the field $\vec{L}$, if its duration is sufficiently short, will not be able to switch the element from one state of magnetization into the opposite state. However, simultaneous application of the field $\vec{N}$ and the field $\vec{L}$, during the same short time, will be sufficient to produce this switching.

This phenomenon can be used to produce threshold elements. The threshold is determined by the field $\vec{N}$.

This field on its own cannot cause the element to change its magnetic state and will not destroy the information which it contains. The longitudinal field (parallel to the axis FA) $\vec{L}$ will be supplied by the control current which will be produced in the form of a pulse of a duration and amplitude such that it is insufficient to change the magnetic state. In the presence of the field $\vec{N}$, the magnetic state does change.

Figure 3:
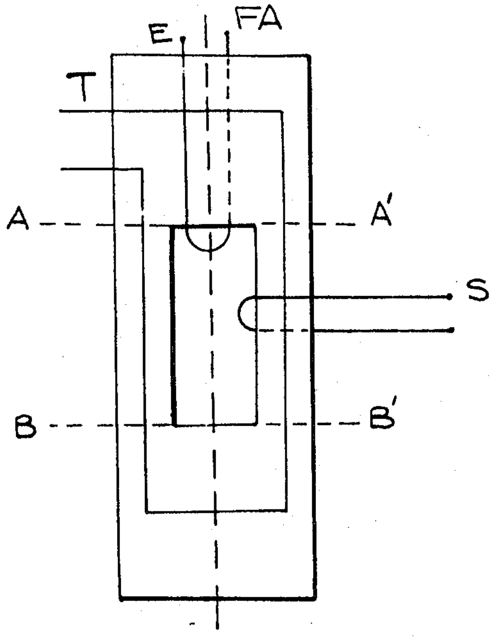
FIG. 3 illustrates an embodiment of an element according to the invention.

FIG. 3 illustrates one embodiment of a magnetic circuit element in accordance with the invention.

It shows a rectangular "torus" made of a magnetic material and having two narrow rectilinear arms AB and A'B', parallel to the easy axis FA. These two identical arms are narrow, have a high reluctance and are therefore easily saturable.

They are connected with one another through wide arms AA' and BB' perpendicular to them, which have negligible reluctance.

A control winding E is wound around the arm AA'. An output winding S is wound around the arm A'B'.

A winding T, the threshold winding, is arranged on the torus.

The operation of the system is as follows:

A current pulse is supplied to the winding E. The current tends to produce a field directed in the narrow legs along the axis FA; whatever the amplitude of this current, fast switching will hardly be possible for the above indicated reason.

A current flowing through the winding T produces a field perpendicular to the axis FA; it forces all the spins to rotate in the same direction and thus coherent rotation is obtained. The element will switch very fast.

The result is that, if the current pulses have a short duration, the element will only be switched if a pulse is supplied simultaneously to the windings E and T; an output pulse will be then produced across the winding S.

This element can be used in a variety of logic circuits.

Figure 4:
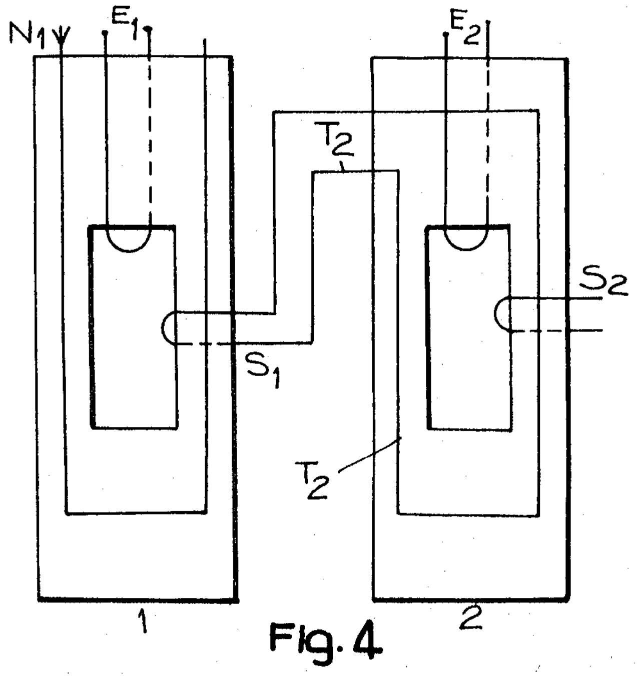
FIGS. 4,5,6 and 7 illustrate logic circuits using elements according to the invention.

FIG. 4 illustrates a flux transfer device having two stages 1 and 2, both of which are identical to the element of FIG. 3.

The winding $S_1$ of the element 1 is in series with the winding $T_2$ of the element 2. The windings $E_1$, $T_1$ and $E_2$ simultaneously receive the pulse F. The operation of the system is as follows:

The pulse F, which is purported at placing the torus 1 in the O condition, produces both the transversal field $\vec{N}_1$, and the longitudinal field $L_1$. If the element 1 is in the 1 condition, the combination of these two fields places it in the O condition. A current pulse then appears in the output circuit. This pulse occurring simultaneously with the pulse F on the winding $E_2$, will cause the element 2 to switch into the 1 condition if it is not already in this state.

If the element 1 is in the 0 condition, no switching takes place so that the element 1 produces no output pulse, the element 2 therefore remaining in the 0 condition.

This structure has the advantage that the output flux of the element 2 is produced by the pulse supplied by a suitable pulse generator such as a clock. Accordingly, the flux gain may be very substantial and the number of output turns may be equal to 1. In addition, when the element 2 is returned to the 0 condition by a control pulse, the current resulting from this produces in the output circuit of the element 1 a field, which is subtracted from the field $\vec{N}_1$, and does not affect the information, supplied by the pulse.

The following figures illustrate logic circuits which use elements in accordance with the invention.

Figure 5:
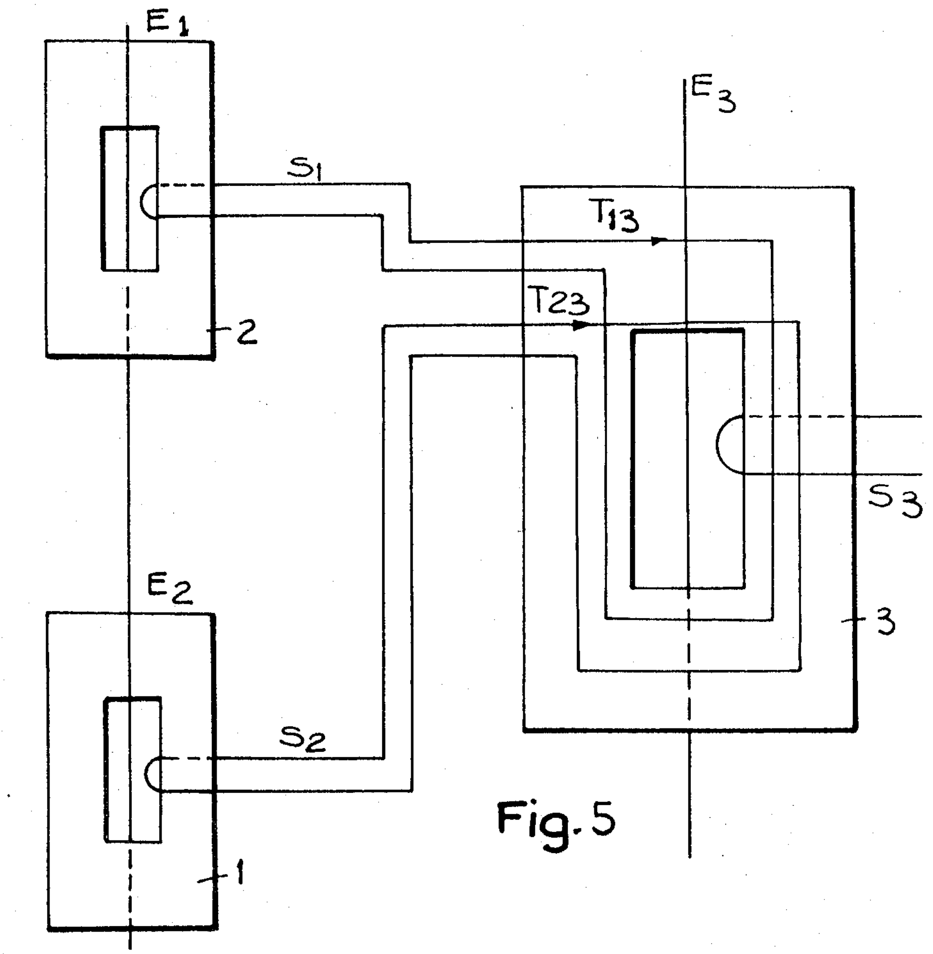

FIG. 5 illustrates an OR-circuit.

It is made up of three elements: the elements 1 and 2 are shown in FIG. 3.

The input windings $E_1$, $E_2$ are arranged in series. The output windings $S_1$ and $S_2$ are coupled to windings $T_{13}$ and $T_{23}$ wound in the same direction, in the element 3, where they are responsible for producing transverse fields having the same direction. The element 3 has its input winding would as shown in FIG. 3.

If the information 1 is present in the element 1, or in the element 2, and a pulse F is supplied to the three windings $E_1$, $E_2$ and $E_3$, then, if one of the two elements 1 and 2 changes state, the result is a pulse which produces a transverse field in the element 3; the latter will then be switched.

Figure 6:
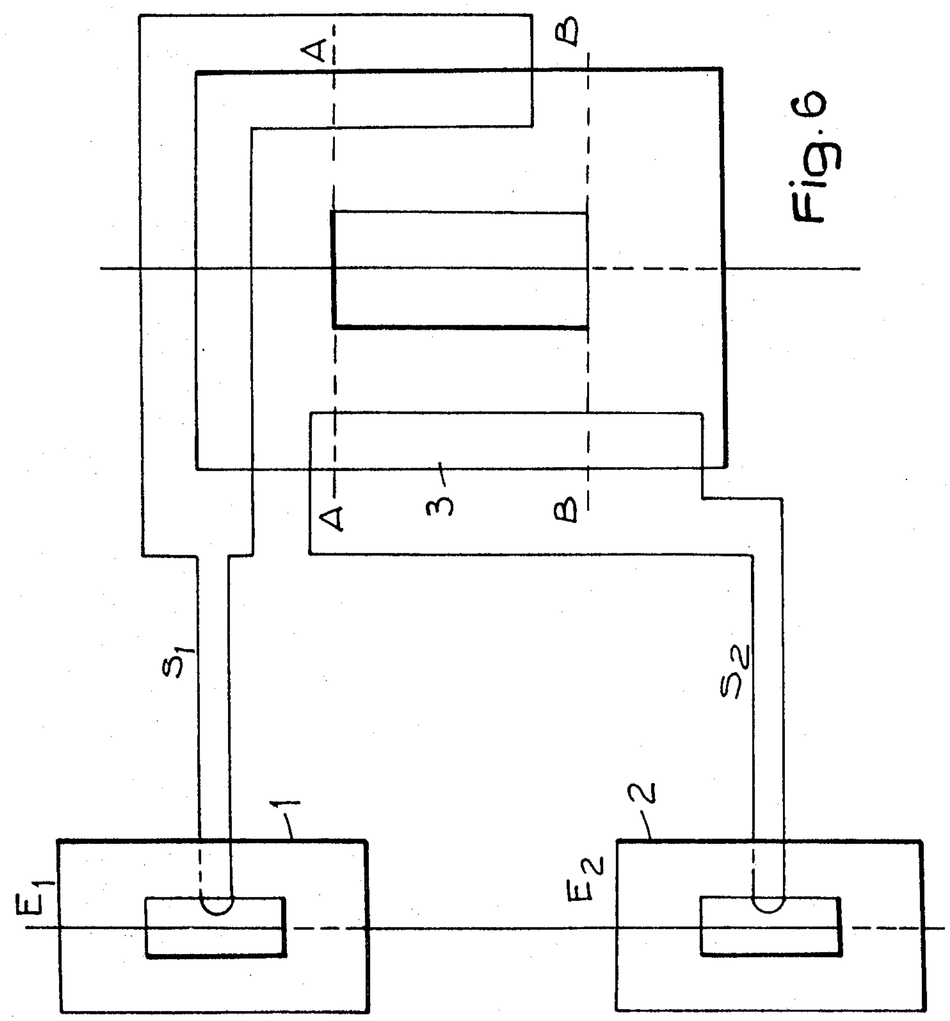

FIG. 6 illustrates an AND-curcuit. It comprises the elements 1, 2 and 5 as in the foregoing example. The output winding $S_1$ of the element 1 produces a transversal field in the arm A'B' of the element 5. The winding $S_2$ produces a transversal field in the arm AB of the element 5. Each of these windings being present in only one of the arms, there will consequently be no output signal in the element 3 unless the two windings $S_1$ and $S_2$ simultaneously carry pulses, synchronously with the input pulse to the element 5. Failing this, the magnetization will not change state.

Figure 7:
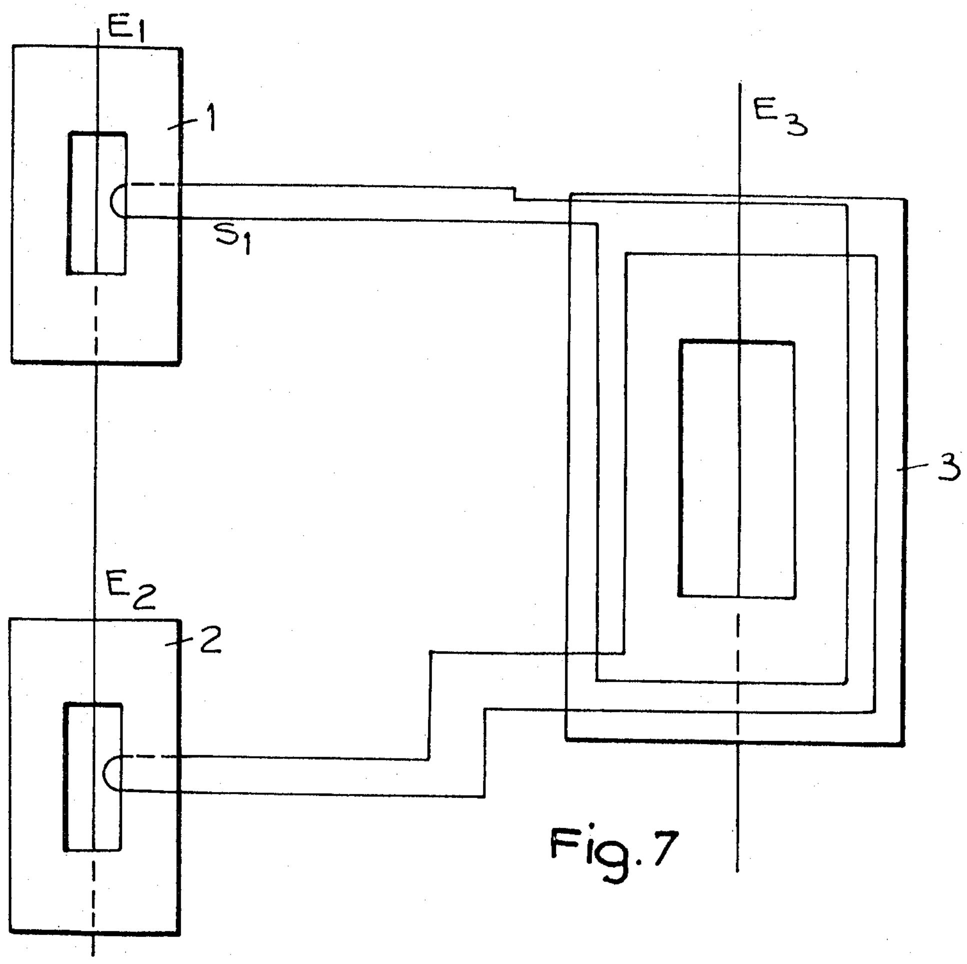

FIG. 7 illustrates an exclusive OR-circuit. The tree elements 1, 2 and 6 are connected in such fashion that the output currents $S_1$ and $S_2$ are in opposite directions in the element 6.

Since the currents have opposite effects, the element 6 will be switched only if a single pulse appears at the output of either the element 1 or the element 2. The simultaneous presence or absence of two output pulses will prevent any switching.

Of course, the invention is not limited to the embodiments described and shown which were given solely by way of example.

What is claimed is:

1. A logical circuit comprising a first and a second input elements, and an output element, each element comprising in combination: a magnetic core made of a single sheet having a magnetic anisotropy; said core having two first legs extending parallely to the easy axis of magnetization and two second legs perpendicular thereto; at least one first input winding wound around at least one of said two first legs, for creating a first magnetic field directed along said easy axis, in one or in the opposite direction, and at least one second winding extending along said second legs, for superimposing to said first field, a second magnetic field in one predetermined direction, perpendicular to said easy axis, and one output winding, wound around one of said legs, means being provided for coupling said input windings of said output element, to said output windings of said input elements.

2. A logical circuit as claimed in claim 1, wherein said input winding of said two input element are series connected; said output element having two second windings wound in the same sense, and connected in series respectively with said output windings of said input elements, said logical circuit thus forming an OR-gate.

3. A circuit as claimed in claim 1, wherein said input windings of said two input elements are connected in series, said output elements having two second windings extending respectively along said second legs and connected in series respectively with said output windings of said input elements, said circuit acting as an AND-gate.

4. A circuit as claimed in claim 1, wherein said input windings of said two input elements are connected in series, and said output element has two second windings wound in opposition, connected respectively in series with the output windings of said input elements, said circuit acting as an OR exclusive circuit.

* * * * *